United States Patent
Schat

(10) Patent No.: US 12,035,133 B2
(45) Date of Patent: Jul. 9, 2024

(54) SECURE KEY GENERATION USING A CHAOTIC OSCILLATOR

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 615 days.

(21) Appl. No.: 17/301,387

(22) Filed: Apr. 1, 2021

(65) Prior Publication Data

US 2022/0322082 A1   Oct. 6, 2022

(51) Int. Cl.
*H04W 12/041* (2021.01)
*H04B 1/04* (2006.01)
*H04B 1/16* (2006.01)

(52) U.S. Cl.
CPC ............ *H04W 12/041* (2021.01); *H04B 1/04* (2013.01); *H04B 1/16* (2013.01)

(58) Field of Classification Search
CPC .... H04W 12/041; H04W 12/047–0471; H04L 63/06–061; H04B 1/04; H04B 1/16
See application file for complete search history.

(56) References Cited

U.S. PATENT DOCUMENTS

| | | | |
|---|---|---|---|
| 6,888,879 B1 * | 5/2005 | Lennen | G01S 19/30 342/135 |
| 6,980,657 B1 | 12/2005 | Hinton et al. | |
| 7,245,723 B2 | 7/2007 | Hinton et al. | |
| 2006/0181428 A1 | 8/2006 | Blaker et al. | |
| 2013/0236007 A1 * | 9/2013 | Munro | H04L 9/0861 380/44 |
| 2016/0234678 A1 * | 8/2016 | Baum | H04W 12/04 |

(Continued)

OTHER PUBLICATIONS

R. Kharel, K. Busawon and Z. Ghassemlooy, "Indirect coupled oscillators for keystream generation in secure chaotic communication," Proceedings of the 48h IEEE Conference on Decision and Control (CDC) held jointly with 2009 28th Chinese Control Conference, Shanghai, China, pp. 4099-4104, doi: 10.1109/CD.*

(Continued)

*Primary Examiner* — Alexander Lagor
*Assistant Examiner* — Rupali Dhakad
(74) *Attorney, Agent, or Firm* — Daniel D. Hill

(57) ABSTRACT

A communication device and method are provided for communicating data, such as a cryptographic key, wirelessly to another communication device. The communication device and the other device each include an oscillator circuit portion, an inverter, a non-inverting buffer, and a switch for switching between the inverter and non-inverting buffer. A circular loop is formed wirelessly between the oscillator circuit portions of both devices by placing both communication devices near each other. A control circuit in each device measures a parameter such as frequency or waveform pattern of the circulating signal to determine how to position the switches. The oscillator circuit portions may be portions of the same oscillator distributed between the devices, such as a delay line-controlled oscillator or a chaotic oscillator. Inverting and not inverting the circulated signal changes the parameter of the signal so that it is difficult for an eavesdropper to learn the communication.

17 Claims, 7 Drawing Sheets

(56) References Cited

U.S. PATENT DOCUMENTS

2017/0085367 A1\* 3/2017 Fernández ............... G06F 1/04

OTHER PUBLICATIONS

Balasubramaniam, P. et al.; "Synchronization of Chaotic Systems using Feedback Controller: An Application to Diffie-Hellman Key Exchange Protocol and ElGamal Public Key Cryptosystem"; Journal of the Egyptian Mathematical Society; Received Jun. 21, 2013; Revised Sep. 5, 2013; Accepted Oct. 3, 2013; DOI: 10.1016/j.joems.2013.10.003.
Bosch; PNS For CAN; Plug-and-Secure Communication for CAN; Mar. 10, 2017.
Chen, Mo et al.; "Hidden Dynamics and Multi-Stability in an Improved Third-Order Chua's Circuit"; Received Sep. 13, 2015; Accepted Sep. 29, 2015; Published in The Journal of Engineering 2015; DOI: 10.1049/ioe.2015.0149.
ETSI EN 302 065-1 V2.1.1 (Nov. 2016); Harmonised European Standard; Short Range Devised (SRD) Using Ultra Wide Band Technology (UWB); Harminised Standard Covering the Essential Requirements of Article 3.2 of the Directive 2014/53/EU; Part 1: Requirements for Generic UWB Applications; Publication Nov. 2016.
Kennedy, Michael Peter; "Three Steps to Chaos—Part I: Evolution"; Published in IEEE Transactions on Circuits and Systems I: Fundamental Theory and Applications (vol. 40, Iss. 10); Oct. 1993; DOI: 10.1109/81.246140.
Keuninckx, Lars et al.; Encryption Key Distribution Via Chaos Synchronization; Received Oct. 14, 2016; Accepted Jan. 18, 2017; Published Feb. 24, 2017; nature.com / Scientific Reports; DOI: 10.1038/srep43428.
Miller, Damon A. et al.; "Experimental Realization of Observer-Based Hyperchaos Synchronization"; IEEE Transactions on Circuits and Systems I: Fundamental Theory and Applications; vol. 48, Iss. 3; Mar. 2001.
Panas, Andrey et al; "Single-Transistor Microwave Chaotic Oscillator"; Proc. NOLTA-2000, Sep. 17-21, 2000, Dresden, Germany, vol. 2, pp. 445-448.
Pecora, Louis M. et al.; Synchronization in Chaotic System; Physical Review Letters 64(8); Mar. 1990; DOI: 10.1063/1.4917383.
Stavrinides, S.G. et al.; "A Digital Nonautonomous Chaotic Oscillator Suitable for Information Transmission"; Published in IEEE Transactions on Circuits and Systems II: Express Briefs ( vol. 60, Iss. 12); Dec. 2013; DOI: 10.1109/TCSII.2013.2285967.
Xiao, Ruwu et al.; "On the Design of Full Duplex Wireless System With Chaotic Sequences"; Discrete & Continuous Dynamical Systems—S; vol. 12, Aug. & Sep. 2019; DOI: 10.3934/dcdss.2019052.

\* cited by examiner

| SIGNAL | ~ | ~ | WWW | WWWW | ~ | ~ | ~ | WWWW |
|---|---|---|---|---|---|---|---|---|
| SWITCH 20 | 0 | 1 | 0 | 1 | 1 | 1 | 0 | 1 |
| SWITCH 40 | 0 | 1 | 1 | 0 | 1 | 1 | 0 | 0 |
| | 1 | 2 | 3 | 4 | 5 | 6 | 7 | 8 |

FIG. 2

SECURE KEY GENERATION USING A CHAOTIC OSCILLATOR

BACKGROUND

Field

This disclosure relates generally to data security, and more particularly, to secure key generation using a chaotic oscillator.

Related Art

Some traditional methods for providing device security require relatively high processing power to implement. A key exchange, such as the well-known Diffie-Hellman key exchange, involves establishing a common key to use for authentication, such as for example, a session key that may be used by multiple parties in a data transfer. A key exchange can be one of the more time and power consuming security provisions. Because many devices have relatively low processing power, such as radio frequency identification (RFID) and so-called internet of things (IoT) devices, there is a physical layer security, which can be complemented with cryptography. Key exchanges are vulnerable to various attack strategies such as eavesdropping, replay attacks, and man-in-the-middle attacks. Therefore, a method and circuit are desirable to provide effective protection against these types of attacks for a key exchange in a relatively low processing power environment using the physical layer.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates switch settings for the embodiment of FIG. 1.

DETAILED DESCRIPTION

Figure 1:
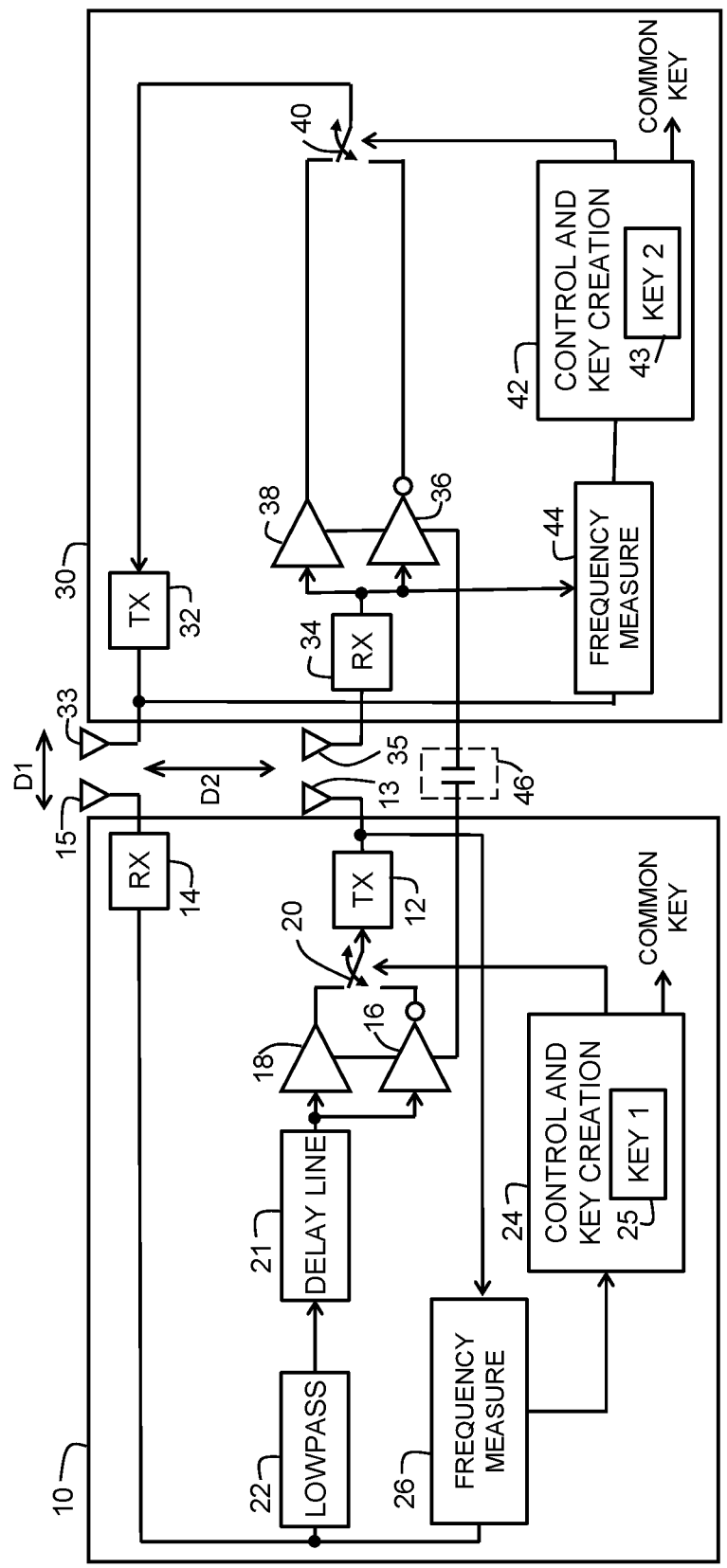
FIG. 1 illustrates two communication devices positioned for a data transfer in accordance with an embodiment.

Generally, there is provided, a communication device and a method. The method is for generating a common key for data transfer between a first communication device and a second communication device. The first communications device comprises a first circuit to create a first cryptographic key, a first oscillator portion, an inverter, a non-inverting buffer, a switch, and a control circuit. The second communications device comprises a second circuit to create a second cryptographic key different from the first cryptographic key, a second oscillator portion, an inverter, a non-inverting buffer, and a switch. In one embodiment, the first and second oscillator portions are different portions of the same oscillator. In another embodiment, the first and second oscillator portions are separate complete oscillators. The first and second oscillator portions may comprise, for example, a delay line in one embodiment or a chaotic oscillator in another embodiment. The inverter and the non-inverting buffer are coupled together in parallel and each have an input terminal coupled to receive an output signal from the oscillator portion, and an output terminal coupled to an input terminal of the switch. An output terminal of the switch is coupled to an input of a transmitter circuit. The inverter and the non-inverting buffer are provided to change a characteristic of the transmitted output signal. The switch, controlled by a control circuit, connects either the output of the inverter or the non-inverting buffer to the transmitter depending on whether a logic one (1) bit or a logic zero (0) bit is being transmitted. In an embodiment having a delay line-controlled oscillator, switching between the inverter and the non-inverting buffer changes a frequency of the transmitted signal. In an embodiment, having a chaotic oscillator, switching between the inverter and the non-inverting buffer changes a waveform pattern of the transmitted output signal. The control circuit includes a measurement circuit that receives the input signal from the second communication device and determines the characteristic of the received input signal and positions the switch based at least in part on the switch position of the second communication device. The described embodiments make it difficult for an attacker to determine which device is transmitting and make it difficult for the attacker to decode the transmitted data.

In accordance with an embodiment, there is provided, a method including: generating a first signal stream using a first oscillator portion, wherein the first signal stream is based on a control signal representative of bit values of a first cryptographic key, wherein a first characteristic of the first signal stream is determined by whether the first signal stream is inverted or not inverted in response to the bit values of the first cryptographic key; transmitting the first signal stream from the first oscillator portion to the second wireless device; receiving the first signal stream at a second oscillator portion of the second wireless device; determining the first characteristic of the received first signal stream in the second wireless device to enable reception and decoding of the first signal stream in the second wireless device to reproduce the first cryptographic key in the second device; using the second oscillator portion to generate a second signal stream based on a control signal representative of bit values of a second cryptographic key, wherein a second characteristic of the second signal stream is determined by whether the second signal stream is inverted or not inverted in response to the bit values of the second cryptographic key; transmitting the second signal stream from the second oscillator portion to the first wireless device; receiving the second signal stream at the first oscillator portion of the first wireless device; determining the second characteristic of the received second signal stream in the first wireless device to enable reception and decoding of the second signal stream in the first wireless device to reproduce the second cryptographic key in the first wireless device; and creating a common key using the first and second cryptographic keys. The first and second oscillator portions may include a delay line. The first oscillator portion may be a first chaotic oscillator portion and the second oscillator portion may be a second chaotic oscillator portion, and wherein the first oscillator portion may operate in synchronization with the second chaotic oscillator portion. The first and second chaotic oscillator portions may be different portions of a same chaotic oscillator distributed between the first and second wireless devices. Each of the first and second wireless devices may include a transmit antenna and a receive antenna, the method may further include positioning the first device a distance less than one wavelength of the first or second frequencies from the second device prior to the transmitting and the receiving. The first and second wireless devices may transmit and receive using one of either near field communications (NFC) or ultra-wideband (UWB). The first wireless device may have a transmit antenna and a receive antenna spaced apart from each other by a first distance, and the second wireless device may have a transmit antenna and a receive antenna spaced apart from each other by a second distance, and wherein during the transmitting of the first signal stream, the transmit antenna of the first wireless device may be positioned a third distance from the receive antenna of the second antenna, wherein the first distance may be greater than either of the second distance or the third distance. Creating the common key further comprises creating one of either an authentication key, a session key, or a MAC (Message Authentication Code). The first and second characteristics may be determined by switching an inverter in or out of a signal path in each of the first and second wireless devices, respectively. Determining the first characteristic and the second characteristic may further include determining a waveform pattern of the received first and second signal streams, respectively.

In another embodiment, there is provided a communications device, including: a radio frequency (RF) receiver coupled to a receive antenna to receive an RF input signal corresponding to bits of a first cryptographic key from another communication device; an oscillator portion having an input for receiving the RF input signal, and an output for providing an output signal; an inverter having an input coupled to receive the output signal and an output for providing an inverted output signal; a non-inverting buffer coupled in parallel with the inverter and having an output for providing the output signal; a switch for coupling either the output of the inverter or the output of the non-inverting buffer to an input of a RF transmitter, the RF transmitter coupled to a transmit antenna for transmitting an RF output signal comprising bits of a second cryptographic key to the another communication device; a control circuit coupled to control the switch in response to detecting a characteristic of the input signal received from the another communication device; and a key creation circuit for combining the first cryptographic key with the second cryptographic key to create a common key for use in a data transfer between the communication device and the another communication device. The oscillator portion may operate in synchronization with a corresponding oscillator portion in the another communication device. The oscillator portion may include a portion of a delay line. A characteristic of the RF input signal may include a frequency of the RF input signal, and wherein the control circuit may further include a frequency measurement circuit for determining the frequency of the RF input signal. The oscillator portion may include a portion of a chaotic oscillator. The characteristic of the RF input signal may include a waveform pattern of the input signal received from the another communication device. The communication device may further include a feature measurement circuit coupled to the control circuit, the feature measurement circuit may compare the waveform pattern of the RF input signal to a waveform pattern of the RF output signal, wherein a result of the comparison may be provided to the control circuit to control the switch. The transmit antenna and the receive antenna of the communication device may be spaced apart from each other by a first distance on the communication device, wherein during a communication with the another communication device, the transmit antenna and the receive antenna of the communication device may be spaced apart from corresponding transmit and receive antennas on the another communication device by a second distance, wherein during reception of the RF input signal, the first distance may be greater than the second distance. The RF input and output signals may be characterized as one of either near field communications (NFC) or ultra-wideband (UWB) signals. The common key may include one of either an authentication key, a session key, or a MAC (Message Authentication Code).

FIG. 1 illustrates communication device 10 positioned for a data transfer with communication device 30 in accordance with an embodiment. Communication device 10 can be, for example, a smartcard communicating with a similar device or with a reader. Communication device 10 includes RF transmitter 12 coupled to transmit antenna 13, radio frequency RF receiver 14 coupled to receive antenna 15, inverter 16, non-inverting buffer 18, switch 20, delay line 21, lowpass filter 22, control and key creation circuit 24, key storage 25, and frequency measure circuit 26. Communication device 30 includes RF transmitter 32 coupled to transmit antenna 33, RF receiver 34 coupled to receiver antenna 35, inverter 36, non-inverting buffer 38, switch 40, control and key creation circuit 42, and key storage 43. A capacitance 46 is coupled to a ground, or reference, terminal of circuits of each device as illustrated. Capacitance 46 may be a wirelessly generated capacitance based on proximity of the devices.

Delay line-controlled oscillators are widely used in RF electronics. The delay line determines the oscillator frequency. A feedback loop of the delay line-controlled oscillator may be inverting or not inverting. A number of wavelets that are present in the delay line at any time can be any integer number, i.e., 1, 2, 3, . . . These different numbers of wavelets are called modes. A lowpass filter, such as lowpass filter 22, ensures that only the intended mode has a closed loop amplification larger than 1, such that a stable oscillation can occur. As shown in FIG. 1, communication devices 10 and 30 are positioned for communication such that a signal circulates in a closed loop between the two devices. In one embodiment, a delay line-controlled oscillator spans over two different devices, each device can either invert or not invert a signal using an inverter or non-inverting buffer and a switch. A delay line controlled oscillator is formed between devices 10 and 30 by lowpass filter 22, delay line 21, inverter 16 or non-inverting buffer 18 depending on the position of switch 20, transmitter 12, antenna 13, antenna 35, receiver 34, inverter 36 or non-inverting buffer 38 depending on the position of switch 40, transmitter 32, antenna 33, antenna 15, receiver 14 and back to lowpass filter 22. In one embodiment, ground terminals of the circuits of devices 10 and 30 are coupled together via a capacitor 46 which may be implemented wirelessly using a plate electrode on each of devices 10 and 30. In other embodiments, the grounds may be coupled together in various ways depending on the operating frequency using the antennas or via capacitive coupling.

In one embodiment, communication devices 10 and 30 are positioned relative to each other to facilitate a signal stream transmitted via a wireless interface. That is, transmit antenna 13 on device 10 is positioned proximate to receive antenna 35 on device 30, and transmit antenna 33 is positioned proximate to receive antenna 15. Either of the devices can either invert, using inverters 16 and 36, or not invert, using non-inverting buffers 18 and 38, the transmitted signal. A sum of delays provided by the amplifiers, lowpass filter, interfaces, and delay line may be represented by τ. This delay determines a frequency of oscillation f, where frequency f equals, e.g., 1/τ if both devices 10 and 30 invert the signal or both devices do not invert the signal, and frequency f equals, e.g., 2/τ if only one of the devices inverts the signal. Also, a different delay produces different modes, such as 0.5, 1.5, 2.5 wavelets over the delay line resulting in frequencies 2/τ, 2/3τ, 2/5τ, respectively. Hence, the frequency f depends on the switch settings of both devices 10 and 30, which can efficiently hide the switch settings of both devices from an eavesdropper. As depicted in Table 1, each device can invert or not invert the signal. In Table 1, non-inversion is symbolized by a "1" and inversion is symbolized by a "0." The frequency depends on switch setting of both devices.

TABLE 1

| Measured frequency | Device 1 | Device 2 |
|---|---|---|
| 1/τ | 0 | 0 |
| 1/τ | 1 | 1 |
| 2/τ | 0 | 1 |
| 2/τ | 1 | 0 |

A distance D1 between the device antennas 13 and 35 and 15 and 33 is preferably very small, for example, much less than one wavelength, so that transmission delay does not significantly impact a turn-around time of the signal. For example, near field communication (NFC) applications, like contactless payment, contactless door access, etc., use a frequency of 2.4 GHz, and thus have a wavelength of about 12 centimeters (cm). Car access-and-go applications and internet of things (IoT) applications with typical wavelengths in the 1-meter (m) range. Other applicable radio bands include the industrial, scientific and medical (ISM) bands. The ISM bands may have applications operating at a frequency of 13.5 MHz have a wavelength of 22 meters. Other WLAN applications may have a wavelength of 1-20 meters. To make eavesdropping, replay attacks, and man-in-the-middle attacks more difficult, transmit antenna 13 is located a distance D1 from receive antenna 15. D1 is chosen to be as close a practical. To reduce crosstalk and interference between the transmit antennas and receive antennas on the devices, a distance D2 is chosen to be much greater than distance D1, within physical limits of the device, to minimize interference between concurrently occurring transmissions between devices 10 and 30.

In one embodiment, a cryptographic key is transmitted by each device to the other device. The transmitted cryptographic keys are then used by each device to create a common key (COMMON KEY) for use in a data transfer between the two devices. Control and key creation circuit 24 in device 10 controls switch 30 to select either inverter 16 or non-inverting buffer 18 to transmit a bit having a logic value (0 or 1) by transmitter 12 and antenna 13 corresponding the key value being transmitted. Likewise, at the same time, control and key creation circuit 42 in device 30 controls switch 40 to transmit a bit having a logic value (0 or 1) by transmitter 32 and antenna 33. As described above, the selection of inverter 16 or non-inverting buffer 18 also determines a oscillation frequency of the delay line-controlled oscillator formed by devices 10 and 30. To receive and decode the transmitted bit by the other device, for example, in device 10, receiver 14 is connected to provide the received bit to frequency measurement circuit 26, which measures the frequency of the received signal from receiver 14, and outputs a bit which indicates if the frequency f of the received signal is 1/τ or 2/τ.

Control and key creation circuits 24 and 42 make use of the determination of the frequency of the received bits to determine the transmission frequency of the transmitted and received signals to allow full duplex data communication between the two devices. This makes it difficult for an eavesdropper who can come sufficiently near to the devices to measure a phase difference between the two transmitters and receivers. Knowing the phase difference can be used to reveal the switch settings. Such an attack requires the eavesdropper to be within a few wavelengths of the devices, depending, at least in part, on the wavelength of the transmitted signals.

FIG. 2 illustrates switch settings and corresponding signal waveforms for the embodiment of FIG. 1. The first row, labeled "SIGNAL", is a simple pictorial of a transmitted waveform in a plurality of time slices to represent a transmitted frequency. Waveforms representing two frequencies are shown. Each of the columns numbered 1-8 in FIG. 2 represents one time slice of the waveform of the oscillator signal formed between device 10 and device 30. Under each waveform a signal having the logic state corresponding to the switch position of the applicable one of switches 20 and 40 is provided by either the inverter or the non-inverting buffer as controlled by control circuits 24 and 42, respectively. That is, the inverters 16 and 36 provide the logic "0" states and the non-inverting buffers 18 and 38 provide the logic "1" states. Note that when both devices transmit the same logic bit value (both either transmit 0 or 1) at the same time as shown in time slices 1, 2, 5, 6, and 7, the oscillator frequency is lower than when the devices transmit different bit values as shown in time slices 3, 4, and 8.

In the embodiment of FIG. 1, an eavesdropper who can come sufficiently near devices 10 and 30 may be able to measure a phase difference between the two signals transmitted between them and use the phase difference to determine the switch positions. Using an oscillator that generates an irregular waveform can make it more difficult for an eavesdropper to determine the phase difference. A chaotic oscillator is an example of an oscillator that produces a waveform with a pattern that ideally never repeats, at least for a very long time. Also, the output signal of a chaotic oscillator is very sensitive to initial conditions and conditions during operation making it very unpredictable. A chaotic oscillator may be made from standard electronic components and generally includes one or more non-linear elements, one or more locally active resistors (e.g., a linear amplifier), and three of more energy storage elements. Even though a chaotic oscillator produces an unrepeating signal, the chaotic oscillator may be restricted to a frequency band of, e.g., an octave. A chaotic oscillator may be constructed that operates in the ultra-wideband (UWB) frequency band.

UWB occupies the 3 to 10 Giga Hertz (GHz) range, which is convenient for many commercial high-data rate applications, and allows the use of standard complementary metal oxide semiconductor (CMOS) processes in integrated circuit manufacturing, relatively low transmit power, good signal transfer characteristics, and small antennas, and is accepted by nearly all countries.

Figure 3:
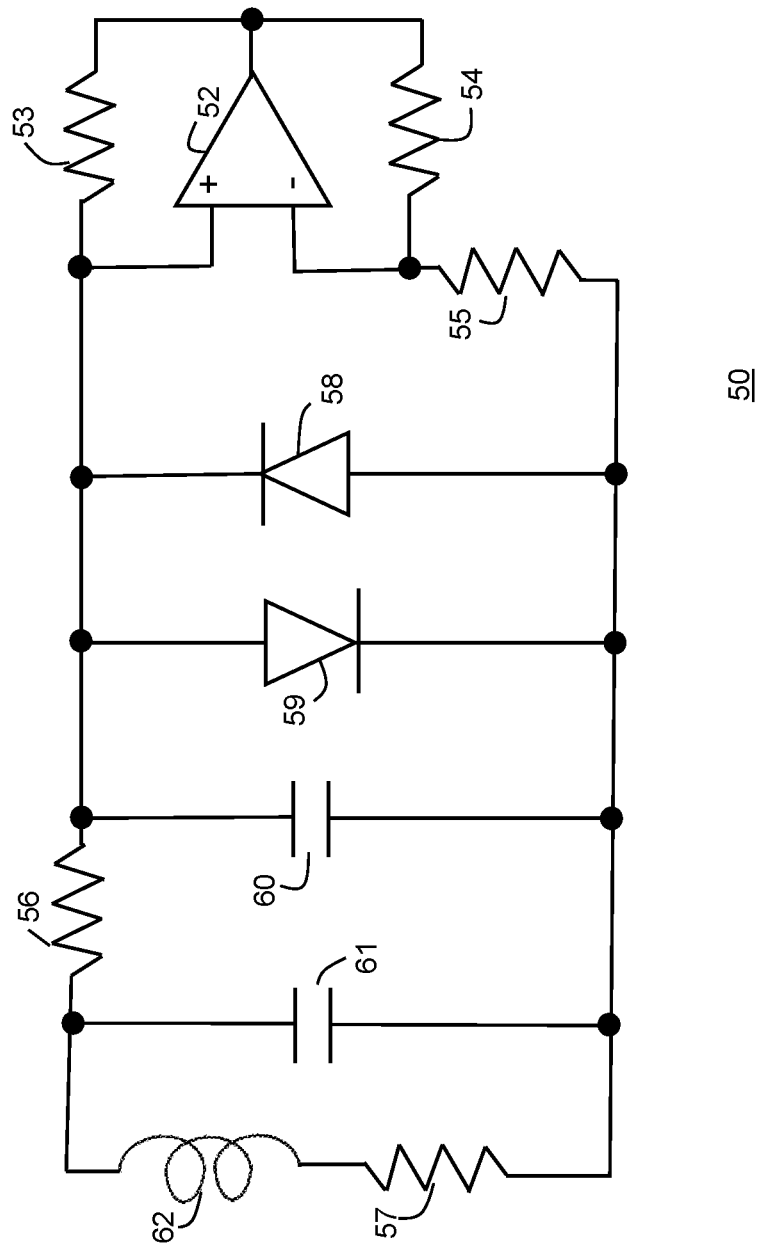
FIG. 3 illustrates a chaotic oscillator in accordance with the prior art.

FIG. 3 illustrates chaotic oscillator 50 in accordance with the prior art. Chaotic oscillator 50 is described in a publication by Chen et al. entitled "Hidden dynamics and multi-stability in an improved third-order Chua's circuit" published in *The Journal of Engineering*, 2015, Vol. 2015, Iss. 10, pp 322-324. Chaotic oscillator 50 includes operational amplifier 52, resistors 53-57, diodes 58 and 59, capacitors 60 and 61, and inductor 62. Chaotic oscillator 50 is provided as one example of a chaotic oscillator that can be used to implement the described embodiments.

Figure 4:
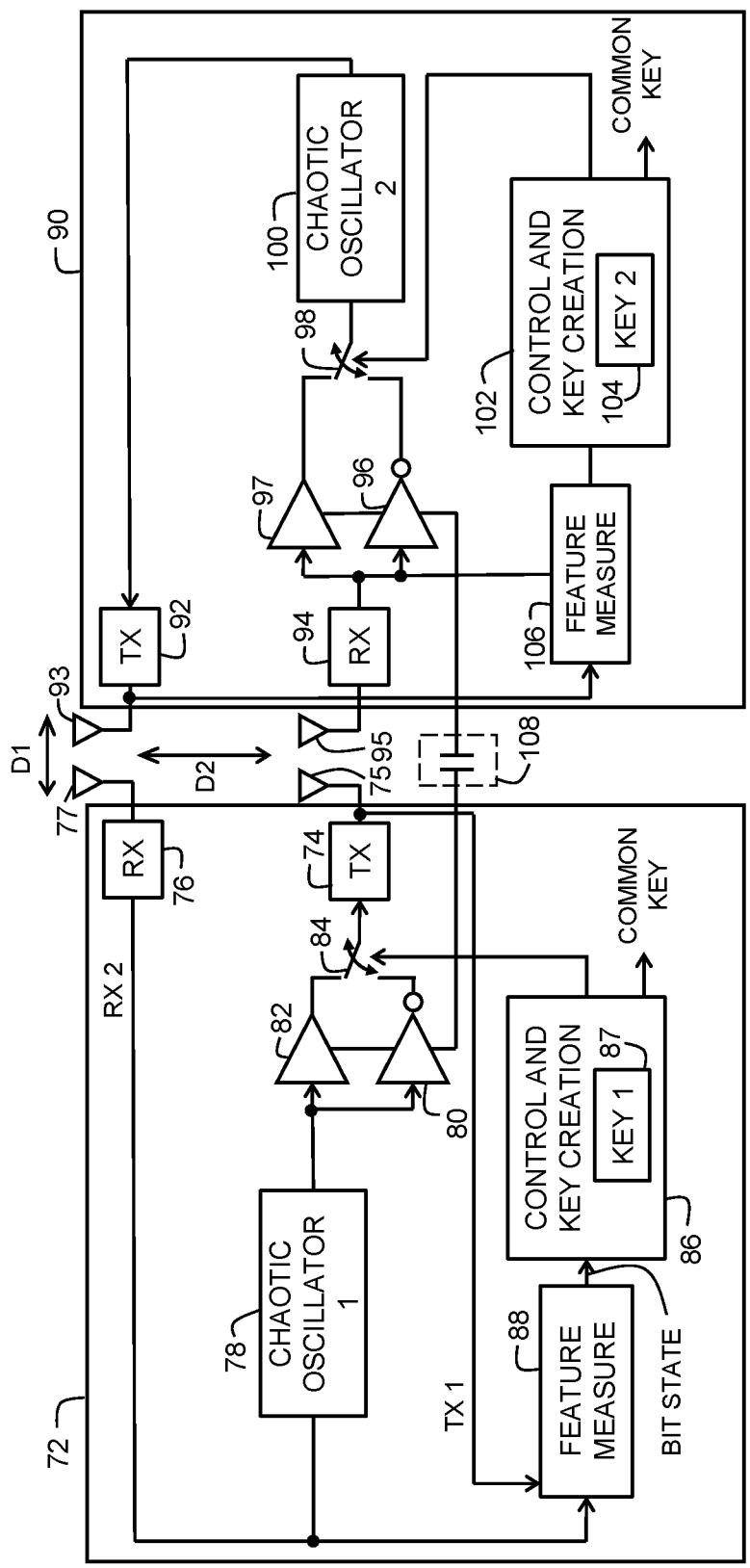
FIG. 4 illustrates two communications devices positioned for a data transfer in accordance with another embodiment.

FIG. 4 illustrates communication device 72 positioned for a data transfer with communication device 90 in accordance with another embodiment. Communication device 72 includes transmitter 74 connected to antenna 75, receiver 76 connected to antenna 77, chaotic oscillator portion 78, inverter 80, non-inverting buffer 82, switch 84, feature measurement circuit 88, control and key creation circuit 86, and key storage 87 for storing an encryption key labeled "KEY 1." Communication device 90 includes transmitter 92 connected to antenna 93, receiver 94 connected to antenna 95, inverter 96, non-inverting buffer 97, chaotic oscillator portion 100, control and key creation circuit 102, key storage 104 for storing an encryption key labeled "KEY 2," and feature measurement circuit 106.

In the illustrated embodiment of FIG. 4, chaotic oscillator portions 78 and 100 can be separate chaotic oscillators or different parts of the same chaotic oscillator, such as for example, different parts of chaotic oscillator circuit 50 in FIG. 3. In the case where chaotic oscillator portions 78 and 100 are separate oscillators, chaotic oscillators run in synchronization with each other so that both oscillators converge to the same values and operate in step with each other. Assume first that chaotic oscillator portions 78 and 100 are separate oscillators, chaotic oscillator 78 can induce chaotic oscillator 100 to run in synchronization with it by transmitting a chaotic signal to chaotic oscillator 100. A circular loop is formed using both devices from chaotic oscillator 78 to either of inverter 80 on non-inverting buffer 82 depending on the position of switch 84, to receiver 94 via transmitter 74. In device 90, the signal from receiver 94 is provided through inverter 96 or non-inverting buffer 97 depending on the position of switch 98, to chaotic oscillator 100 and back to chaotic oscillator 78 through transmitter 92 and receiver 76. Feature measurement circuit 88 receives the signal RX 2 from receiver 76 and the signal transmitted to device 90 labeled TX 1 to determine the logic value of the transmitted logic bit (BIT STATE). The BIT STATE is provided to control and key creation circuit 86. The use of the parallel-connected inverter 80 and non-inverting buffer 82 provides a parameter to chaotic oscillator 100 that changes a waveform pattern of the chaotic signal based on the position of switches 84 and 98. The waveform pattern generated by the combination the chaotic oscillators between devices 72 and 90 is determined by the position of both switches 84 and 98. That is, when switches 84 and 98 are both in the same position, one waveform pattern is transmitted, and when switches 84 and 98 are in different positions from each other, another waveform pattern is generated.

In one embodiment, ground, or reference, terminals of the circuits of devices 72 and 90 are coupled together via a capacitor 108 which may be implemented wirelessly using a plate electrode on each of devices 72 and 90. In other embodiments, the grounds may be coupled together in various ways depending on the operating frequency using the antennas or via capacitive coupling.

Figure 5:
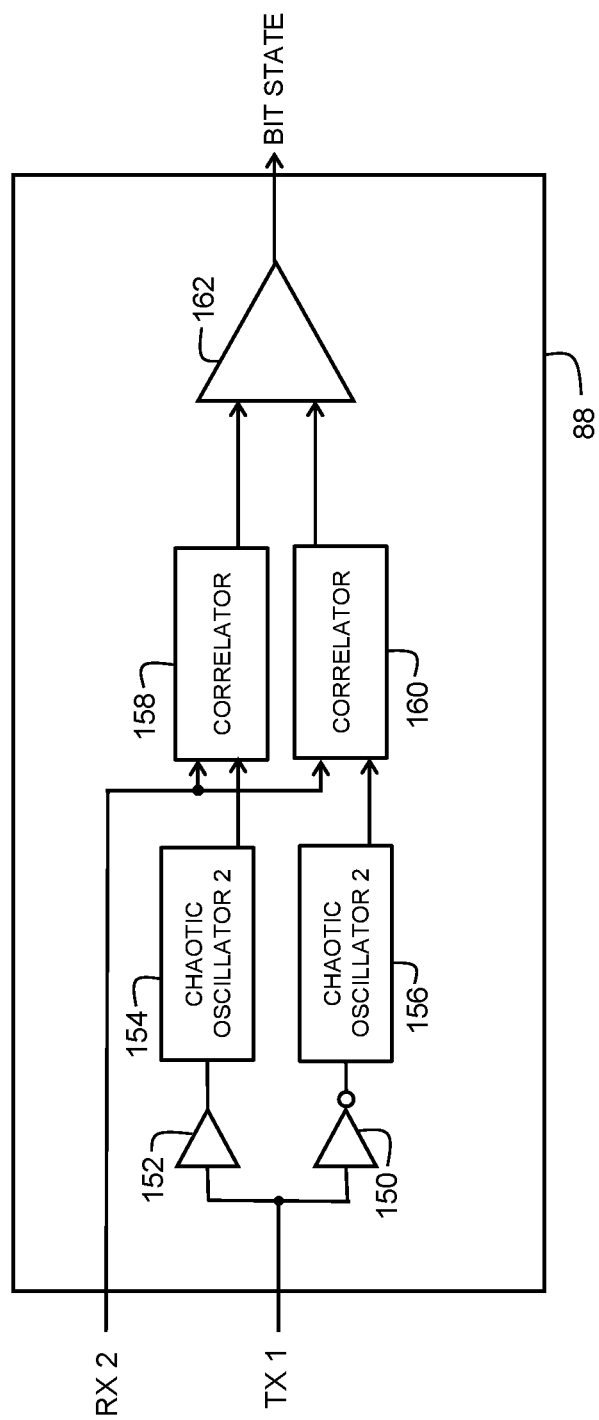
FIG. 5 illustrates the feature measure circuit of FIG. 4 in accordance with an embodiment.

FIG. 5 illustrates feature measurement circuit 88 of FIG. 4 in accordance with an embodiment. Note that feature measurement circuits 124 and 144 in FIG. 7, and feature measurement circuit 106 in FIG. 4 are similar to feature measurement circuit 88. Feature measurement circuit 88 includes inverter 150, non-inverting buffer 152, chaotic oscillators 154 and 156, correlators 158 and 160, and comparator 162. The transmitted output of chaotic oscillator 78 (TX 1) is provided to inverter 150 and non-inverting buffer 152. Generally, feature measurement circuit 88 emulates an output signal from chaotic oscillator 100 using chaotic oscillators 154 and 156. Chaotic oscillator 154 receives a not inverted signal TX 1 from non-inverting buffer 152. Chaotic oscillator 156 receives an inverted signal TX 2 from inverter 150. The outputs of chaotic oscillators 154 and 156 are provided to inputs of correlators 158 and 160, respectively. The output of chaotic oscillators 154 and 156 are correlated against the received output signal RX 2. Comparator 162 decides which of the two emulated signals output from chaotic oscillators 154 and 156 matches the received actual output signal from chaotic oscillator 100 to determine if the transmitted bit is a "0" or a "1".

Figure 6:
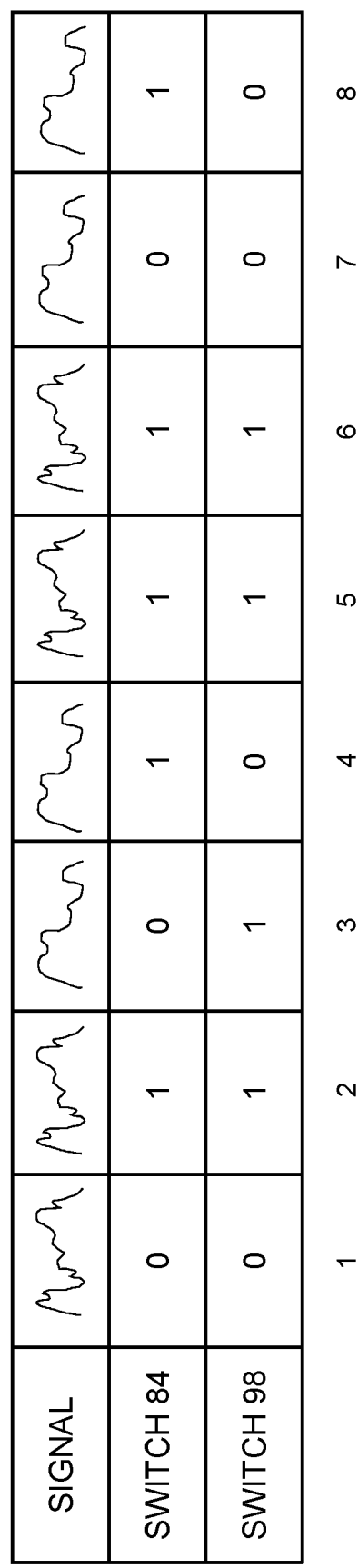
FIG. 6 illustrates switch settings for the embodiment of FIG. 4.

FIG. 6 illustrates a table of switch settings for communication devices 72 and 90 of FIG. 4. The top row of the table of FIG. 6 shows the waveform pattern being produced by the switch settings of switches 84 and 98. When the same bit value, either logic "0" or logic "1" is produced by the switch settings of both devices, then a first waveform pattern is produced by the combination of both devices, as shown in time slices numbered 1, 2, 5, 6, and 7. Time slices 3, 4, and 8 illustrate the waveform pattern produced by the combination of chaotic oscillators 78 and 100 when the bit values provided by switches 84 and 98 are different from each other. For example, time slice 3 shows the switch 84 selection of inverter 80 and the switch 98 selection of non-inverting buffer 97. Feature measurement circuits 88 and 106 are coupled to receive the chaotic output signal of chaotic oscillators 100 and 78, respectively, and to decode the chaotic signal to reproduce the logic bit that was transmitted.

In the manner described above and illustrated in FIG. 4-FIG. 6, a cryptographic key is transmitted by each device to the other device. The transmitted cryptographic keys are then used by each device to create a common key (COMMON KEY) for use to authenticate the devices in a data transfer between the two devices. Control and key creation circuit 86 in device 72 controls switch 84 to select either inverter 80 or non-inverting buffer 82 to transmit a bit having a logic value (0 or 1) by transmitter 74 and antenna 75 corresponding the key value being transmitted. Likewise, control and key creation circuit 102 in device 90 controls switch 98 to select either inverter 96 or non-inverting buffer 97 to transmit a bit having a logic value (0 or 1) by transmitter 92 and antenna 93 corresponding the key value being transmitted. Because the transmission paths between devices 72 and 90 complete a signal loop that is connected by the transmitters and receivers, both chaotic oscillators 78 and 100 determine the waveform pattern by which the bit is transmitted. Feature measurement circuit 88 is provided in device 72 to receive and decode the bit transmitted by the other device. For example, in device 72 receiver 76 is connected to provide the received bit to feature measurement circuit 88, which identifies the waveform pattern and associates the waveform pattern to the logic bit received from device 90. Feature measurement circuit 106 functions similarly in device 90.

Figure 7:
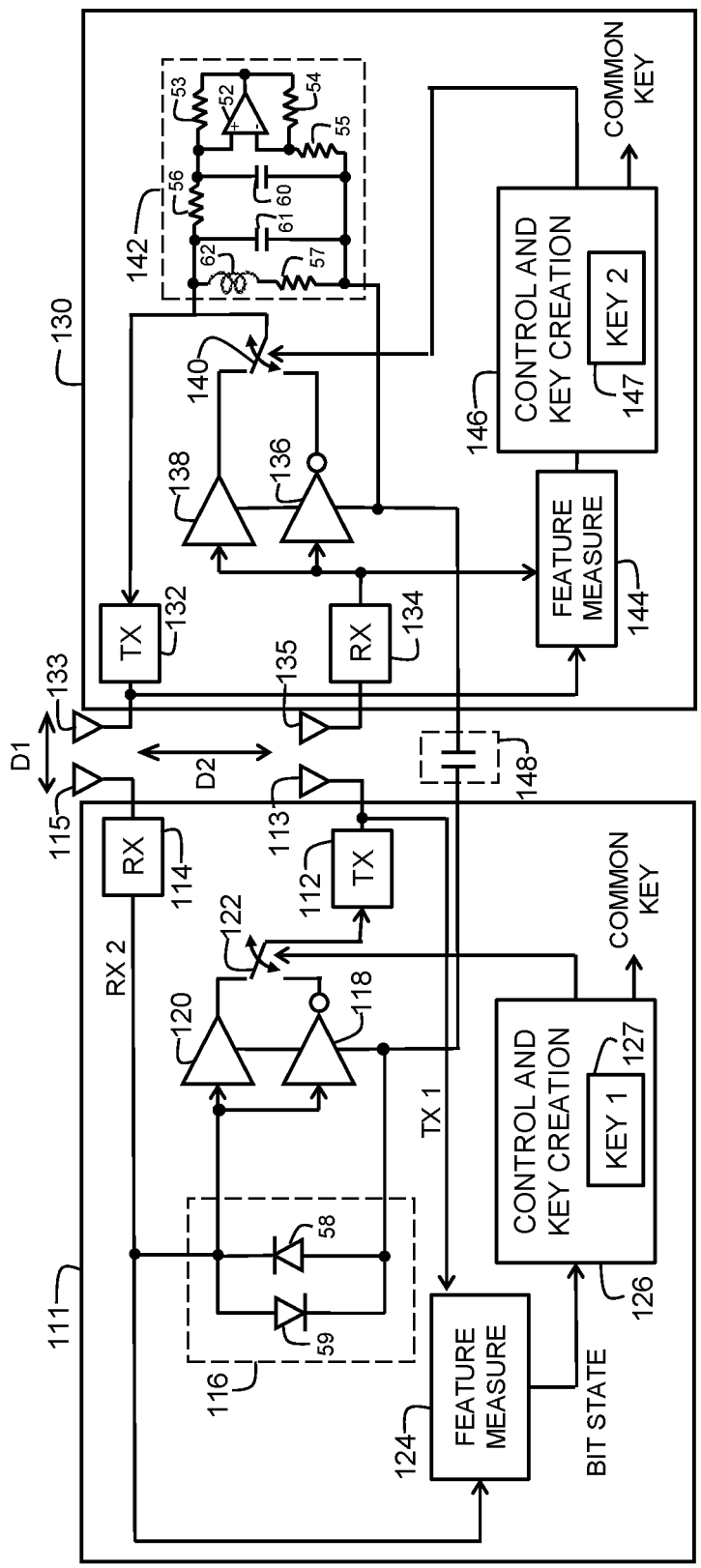
FIG. 7 illustrates two communications devices positioned for a data transfer in accordance with another embodiment.

FIG. 7 illustrates communications device 111 positioned for a data transfer with communications device 130 in accordance with another embodiment. FIG. 7 illustrates a more specific example of the case where a single chaotic oscillator circuit is split between devices. Communications device 111 includes RF transmitter 112 connected to antenna 113, RF receiver 114 connected to antenna 115, inverter 118, non-inverting buffer 120, switch 122, chaotic oscillator portion 116, feature measurement circuit 124, control and key creation circuit 126, and key storage 127. Communications device 130 includes RF transmitter 132 connected to antenna 133, RF receiver 134 connected to antenna 135, inverter 136, non-inverting buffer 138, switch 140, chaotic oscillator portion 142, feature measurement circuit 144, control and key creation circuit 146, and key storage 147.

In one embodiment, ground terminals of the circuits of devices 111 and 130 are coupled together via a capacitor 148 which may be implemented wirelessly using a plate electrode on each of devices 111 and 130 positioned to provide a capacitive coupling between the two devices when the two devices are positioned for communication. In other embodiments, the grounds may be coupled together in various ways depending on the operating frequency using the antennas or via capacitive coupling.

By way of example and without being limiting, chaotic oscillator 50 of FIG. 3 is used to illustrate the embodiment of FIG. 7. Chaotic oscillator 50 is shared between devices 111 and 130 that are communicating with other. An oscillator signal circulates in a closed loop between the two devices. In FIG. 7, chaotic oscillator 50 from FIG. 3 is divided into two portions. A first portion 116 in device 111 includes diodes 58 and 59, and a second portion 142 includes operational amplifier 52, resistors 53-57, capacitors 60 and 61, and inductor 62. In other embodiments, the components of the chaotic oscillator may be shared differently. The circulating signal path through both devices 111 and 130 includes RF transmitter 112, antennas 113 and 135, receiver 134, one of inverter 136 or non-inverting buffer 138, switch 140, chaotic oscillator portion 142, transmitter 132, antennas 133, and 115, receiver 114, chaotic oscillator portion 116, one of inverter 118 or non-inverting buffer 120, and switch 122. Each of devices 111 and 130 can either invert or not invert the circulating signal. In the chaotic oscillator, inversion leads to one waveform pattern, or signal shape, and non-inversion leads to a different waveform pattern. If both devices either invert or not invert the signal at the same time, the same waveform pattern results. Each of devices 111 and 130 can determine the inversion status of the other device by observing the received waveform pattern and by knowing its own switch setting, and hence inversion status. Device 111 includes encryption key KEY 1 stored in key storage 127 and device 130 includes encryption key KEY 2 stored in key storage 147. The devices transmit their keys to each other to allow a common key (COMMON KEY) to be generated by each device.

An eavesdropper can only notice whether the two devices have the same inversion status or not. The eavesdropper cannot determine the value of the transferred signal. That is, the eavesdropper cannot observe the state of the transferred bit if both devices are transmitting a "0" or a "1", the eavesdropper can only know the inversion status. However, the actual keys (KEY 1 and KEY 2) and hence the resulting common keys (COMMON KEY) cannot be concluded from the eavesdropped signal.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
generating a first signal stream in a first wireless device using a first oscillator portion, wherein the first signal stream is based on a control signal representative of bit values of a first cryptographic key, wherein a first characteristic of the first signal stream is determined by whether the first signal stream is inverted or not inverted in response to the bit values of the first cryptographic key;
transmitting the first signal stream from the first-wireless device to a second wireless device;
receiving the first signal stream at a second oscillator portion of the second wireless device;
determining the first characteristic of the received first signal stream in the second wireless device to enable reception and decoding of the first signal stream in the second wireless device to reproduce the first cryptographic key in the second device;
using the second oscillator portion to generate a second signal stream based on a control signal representative of bit values of a second cryptographic key, wherein a second characteristic of the second signal stream is determined by whether the second signal stream is inverted or not inverted in response to the bit values of the second cryptographic key;
transmitting the second signal stream from the second oscillator portion to the first wireless device;
receiving the second signal stream at the first oscillator portion of the first wireless device;
determining the second characteristic of the received second signal stream in the first wireless device to enable reception and decoding of the second signal stream in the first wireless device to reproduce the second cryptographic key in the first wireless device; and
creating a common key in the first and second devices using the first and second cryptographic keys, wherein the first cryptographic key is different from the second cryptographic key, and wherein the common key is used in the first and second wireless devices to authenticate the first and second wireless devices in a data transfer between the first and second wireless devices, wherein the first wireless device has a transmit antenna and a receive antenna spaced apart from each other by a first distance, and the second wireless device has a transmit antenna and a receive antenna spaced apart from each other by the first distance, wherein during the transmitting of the first signal stream, the transmit antenna of the first wireless device is positioned a second distance from the receive antenna of the second wireless device, and during the transmitting of the second signal stream, the transmit antenna of the second wireless device is positioned the second distance from the receive antenna of the first wireless device, wherein the second distance is less than one wavelength of a frequency of the first and second signal streams, and wherein the first distance is greater than the second distance.

2. The method of claim 1, wherein the first and second oscillator portions include a delay line.

3. The method of claim 1, wherein the first oscillator portion is a first chaotic oscillator portion and the second oscillator portion is a second chaotic oscillator portion, and wherein the first oscillator portion operates in synchronization with the second chaotic oscillator portion.

4. The method of claim 3, wherein the first and second chaotic oscillator portions are different portions of a same chaotic oscillator distributed between the first and second wireless devices.

5. The method of claim 3, wherein the first and second wireless devices transmit and receive using one of either near field communications (NFC) or ultra-wideband (UWB).

6. The method of claim 3, wherein creating the common key further comprises creating one of either an authentication key, a session key, or a MAC (Message Authentication Code).

7. The method of claim 3, wherein the first and second characteristics are determined by switching an inverter in or out of a signal path in each of the first and second wireless devices, respectively.

8. The method of claim 3, wherein determining the first characteristic and the second characteristic further comprise determining a waveform pattern of the received first and second signal streams, respectively.

9. A communications device, comprising:
a radio frequency (RF) receiver coupled to a receive antenna to receive an RF input signal corresponding to bits of a first cryptographic key from another communication device;
an oscillator portion having an input for receiving the RF input signal, and an output for providing an output signal;
an inverter having an input coupled to receive the output signal and an output for providing an inverted output signal;
a non-inverting buffer coupled in parallel with the inverter and having an output for providing the output signal;
a switch for coupling either the output of the inverter or the output of the non-inverting buffer to an input of a RF transmitter, the RF transmitter coupled to a transmit antenna for transmitting an RF output signal comprising bits of a second cryptographic key to the another communication device, wherein the second cryptographic key is different from the first cryptographic key;
a control circuit coupled to control the switch in response to detecting a characteristic of the input signal received from the another communication device; and
a key creation circuit for combining the first cryptographic key with the second cryptographic key to create a common key for use in authentication of the communication device with the another device in a data transfer between the communication device and the another communication device,
wherein the transmit antenna and the receive antenna of the communications device are spaced apart from each other by a first distance, and the another communications includes a transmit antenna and a receive antenna spaced apart from each other by the first distance, wherein during the receipt of the RF input signal, the receive antenna of the communications device is spaced apart from the transmit antenna of the another communications device by a second distance, and wherein the second distance is less than one wavelength of a frequency of the RF input signal, and the first distance is greater than the second distance.

10. The communication device of claim 9, wherein the oscillator portion operates in synchronization with a corresponding oscillator portion in the another communication device.

11. The communications device of claim 9, wherein the oscillator portion includes a portion of a delay line.

12. The communication device of claim 9, wherein a characteristic of the RF input signal comprises the frequency of the RF input signal, and wherein the control circuit further comprises a frequency measurement circuit for determining the frequency of the RF input signal.

13. The communications device of claim 9, wherein the oscillator portion includes a portion of a chaotic oscillator.

14. The communication device of claim 13, wherein a characteristic of the RF input signal comprises a waveform pattern of the input signal received from the another communication device.

15. The communication device of claim 14, further comprising a feature measurement circuit coupled to the control circuit, the feature measurement circuit comparing the waveform pattern of the RF input signal to a waveform pattern of the RF output signal, wherein a result of the comparison is provided to the control circuit to control the switch.

16. The communication device of claim 9 wherein RF input and output signals are characterized as one of either near field communications (NFC) or ultra-wideband (UWB) signals.

17. The communication device of claim 9, wherein the common key comprises one of either an authentication key, a session key, or a MAC (Message Authentication Code).

* * * * *